Patented Dec. 25, 1934

1,985,261

UNITED STATES PATENT OFFICE 1,985,261

COMPOUNDING RUBBER AND THE LIKE

John J. O'Hare, North Brookfield, Mass., assignor to American Rubber Products Corporation, New York, N. Y., a corporation of New Jersey No Drawing. Application August 19, 1932, Serial No. 629,502

3 Claims. (Cl. 106—23)

This invention relates to the production of materials having a waxy content, and to the fabrication of articles therefrom, and is of particular utility when utilized in the production of vulcanized rubber articles, although it is capable of use in the production of articles from other material in which it is desirable to have a waxy content.

An important object of the invention is to provide a flux to be used in rubber compounding not only to assist in the dispersion of the dry pigment in the mixing and milling of the rubber formula itself, but also to aid in the production of a final product in which the article fabricated will be formed of a solid compound having a smooth glossy surface adapted to resist abrasion to a certain extent and also to aid in recovery from ordinary abrasion.

Another object of the invention is to provide such an article which will be characterized by having an inherently glossy surface, thus making it unnecessary to apply superficial coatings of wax, varnish, or lacquer for the purpose of enabling the surface to be polished.

Still another purpose of the invention is to provide such an article with a surface which can be readily cleaned by such simple mechanical friction as can be applied by means of a soft dry cloth or by the use of clear water or other inert liquid or cleanser without the use of soap, detergent, alcohol, benzol or other solvents, or of any cleanser having a chemical reagent or a gritty ingredient.

An object of very great importance is to provide an article of the above character fabricated of a solid compound having a smooth surface permanently free from any extravasated dirt-collecting bloom.

Heretofore it has been the custom of the production of vulcanized rubber articles to add waxes or oils to rubber formulae for various reasons, in most cases to facilitate the mixing, in some cases to provide for stiffening or rigidity, and in other cases to provide an anti-oxidant, or to assist acceleration.

While these waxes and oils have accomplished the purposes intended in most cases, there have been other extremely objectionable results contingent upon their use, the principal undesirable effect of such use being what is called "bloom" in the parlance of rubber manufacturers.

What is referred to as "bloom" in this present application, is the result of the migration to the surface, of the waxes or oils contained in a vulcanized rubber article, which migration persists for a consderable period after vulcanization, in some cases leaving a heavy stiff, greasy film that holds and cakes the dust and dirt which comes into contact with it.

It is the general purpose of the present invention to provide a flux that will have all the advantages and none of the disadvantages of the conventional oils or waxes, giving to the vulcanized stock a high, glossy finish, and resistance to abrasion, and that will eliminate the smudging so common to vulcanized rubber goods unless varnished or lacquered after curing.

In pursuance of the above objects of the invention, I have discovered by extensive experimentation that cumar resin may be used, in combination with certain waxy materials, as a satisfactory flux to secure the desirable properties set forth, and an illustrative mode of carrying the invention into effect will now be described.

The first step in this novel process may be accomplished advantageously by mixing together cumar resin, stearic acid and paraffin, in proportions approximating 8.65 parts by weight of cumar resin, 5.0 parts of stearic acid and 1.35 parts of paraffin, and melting these ingredients together until they are completely comingled.

I find that it is impracticable to introduce hard cumar resin directly into the rubber mix, but rather that it is desirable to dissolve the cumar resin in a previously formed hot solution containing paraffin and stearic acid which have a lower melting point than the cumar resin and aid to dissolve the latter when so introduced, and accordingly I not only make use of a relatively hard grade of cumar resin, but also of high melting or hard paraffin wax, and of double compressed stearic acid.

The molten flux thus obtained may then be allowed to solidify, after which it will be added, preferably in a suitably divided solid condition, to a batch of stock material of any desired and suitable formula, such addition being conveniently made upon the rolls according to ordinary practice in rubber mixing.

The following is an example of a suitable formula, viz, twenty-five pounds of rubber, one and one-quarter pounds of flux, three pounds of zinc oxide, one and three-quarter pounds of sulphur, three-quarter pound of accelerator, ten pounds of pigment, and sixty pounds of filler (such as whiting, clay, carbon black, zinc, etc.).

After thorough admixture of the flux with the batch of stock has been accomplished, the stock containing the flux may be treated in the conventional manner, including molding and vulcanization, to produce articles of desired shapes, The articles formed of material compounded as above will be found to present a hard, smooth, glossy surface without the need for application thereto of any coating of wax, lacquer or other polishing material, and such surfaces are unusually resistant to abrasion and when abraded may be readily restored to their original state of smooth glossy finish, by buffing. Such restoration is facilitated by such migration of the waxy content as may be allowed.

The articles thus produced are, however, initially and permanently free from excessive surface bloom due to extravasation of their waxy content, as the migration of the latter to the surface can be controlled or restricted as desired by the nature of the novel flux herein disclosed and claimed.

While the proportions of the ingredients of the flux already specified have given the most satisfactory results in use, the proportions may be somewhat varied without departing from the spirit of the invention.

For example, if it is determined that a greater or less amount of paraffin bloom is desirable in a given stock, it is within the spirit of the invention to change the proportion of paraffin in the formula. An increase in the proportionate amount of paraffin used will permit a quicker recovery. Where a greater migration of the waxes to the surface of the finished article is desired, this can be obtained in two ways, viz first, by adding more of the waxy ingredient or ingredients and less cumar resin to the flux formula, or second, by adding more flux to the rubber compound itself.

If less migration is desired, this can be accomplished by using a less proportion of the waxy ingredient or ingredients and a larger proportion of the cumar resin in the flux formula; or the same result can be accomplished by adding less flux to the rubber compound itself.

Either stearic acid or paraffin may be used in combination with the cumar resin, by suitably varying the amount of such selected ingredient if the other be omitted, depending upon the result desired, but in order to secure a desirably bloom-free product having all of the advantages sought, I prefer to make use of a flux containing all three of the specified ingredients in substantially the proportions set forth.

So also, other waxy substances, such as beeswax, montan, canawba, ceresin, etc. may be employed instead of the stearic acid and/or paraffin, with results exhibiting desirable improvement over those secured according to conventional practice, but such results are not comparable with those secured when the invention is practiced in the preferred manner disclosed.

While the flux is used to greatest advantage in the production of vulcanized rubber compounds, it is capable of utilization in compounding other materials, such as in compounding mastic, magnesite, ceresin and like products.

Articles formed according to the invention, as already indicated, may be cleaned readily by simple mechanical friction, applied by means of a dry soft cloth, or may be cleaned with clear water or other inert cleaner, not requiring the use of any solvent or chemical reagent, or gritty substance, as the compound does not deteriorate, and not being destructively cleaned, its original, glossy surface may be thus maintained readily and permanently by simple cleaning operations not requiring special care or skill.

A notable advantage in manufacturing arises from the novel manner in which stearic acid is utilized as an ingredient in the preformed flux according to my new process. Inasmuch as the stearic acid is ordinarily employed in modern compounding, it has been utilized in my novel flux to bring down the melting point of the flux, so as to facilitate the combining of the flux with the mix, and thus I avoid undue heating of the rolls.

I claim:

1. As a new article of manufacture, a solid vulcanized compound composed of rubber stock, a filler, and a flux comprising stearic acid, paraffin and cumar resin, said flux ingredients being in the proportions of approximately 8.65 parts by weight of cumar resin, 5.0 parts by weight of stearic acid and 1.35 parts by weight of paraffin.

2. As a new composition of matter, a vulcanized rubber compound containing a flux having a waxy content, said flux comprising cumar resin, stearic acid and paraffin in proportions approximating 8.65 parts by weight of cumar resin, 5.0 parts by weight of stearic acid and 1.35 parts by weight of paraffin.

3. In the process of fabricating articles requiring a waxy content, the steps which comprise co-mingling said waxy material with cumar resin in melted condition to form a flux, then permitting said flux to solidify, and vulcanizing said flux with a batch of body material including the following ingredients in substantially the proportions set forth, viz twenty-five pounds of rubber, one and one-quarter pounds of flux, three pounds of zinc oxide, one and three-quarter pounds of sulphur, three-quarter pound of accelerator, ten pounds of pigment and sixty pounds of filler.

JOHN J. O'HARE.